May 16, 1939. V. J. CRONYN ET AL Re. 21,079

APARTMENT STOVE

Original Filed March 26, 1934 2 Sheets-Sheet 1

INVENTORS.
VINCENT J. CRONYN
HENRY PERUZZINI
BY
Hull, Brock & West.
ATTORNEYS.

May 16, 1939. V. J. CRONYN ET AL Re. 21,079
APARTMENT STOVE
Original Filed March 26, 1934 2 Sheets-Sheet 2
FIG. 5.
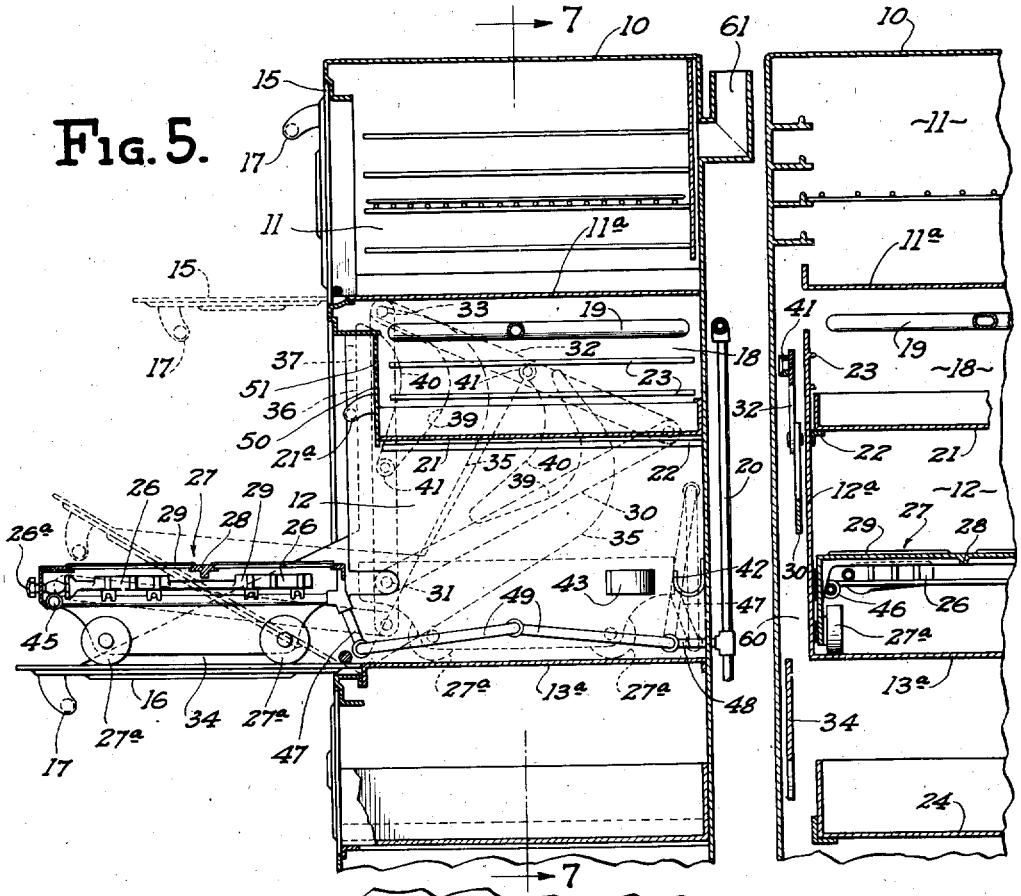
FIG. 6.
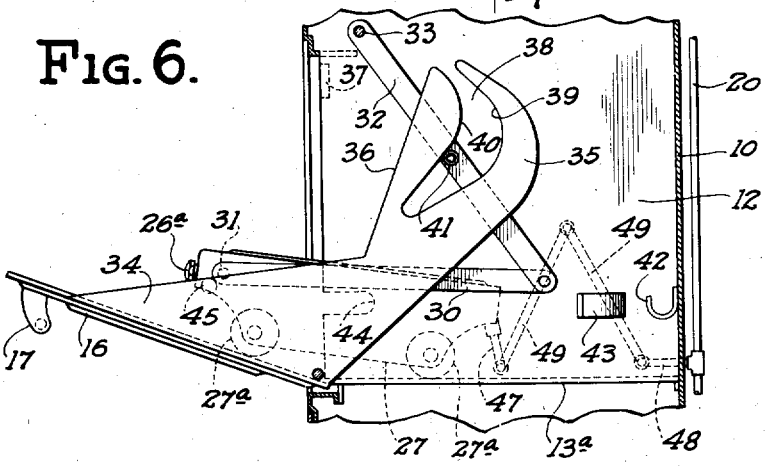
FIG. 7.
INVENTORS.
VINCENT J. CRONYN
HENRY PERUZZINI
BY Hull, Brock & West.
ATTORNEYS.

Reissued May 16, 1939

Re. 21,079

UNITED STATES PATENT OFFICE 21,079

APARTMENT STOVE

Vincent J. Cronyn and Henry Peruzzini, Buffalo, N. Y., assignors to The Tappan Stove Company, Mansfield, Ohio, a corporation of Ohio Original No. 2,040,598, dated May 12, 1936, Serial No. 717,316, March 26, 1934. Application for reissue May 11, 1938, Serial No. 207,320

6 Claims. (Cl. 126—37)

This invention relates to improvements in cooking stoves.

One object of the invention is to provide a stove which will require a minimum amount of space, this object contemplating a construction in which the burners or heating elements and the supporting structure therefor are movable as a unit into the stove when not in use thereby increasing the available space in the vicinity of the stove.

A further object is to provide a stove in which the burners or heating elements, oven, broiler and auxiliary compartments are incorporated in a cabinet-like structure of pleasing appearance.

A still further object is to provide a construction in which the burners or heating elements may be utilized when in their extended position as well as when they are moved to a retracted position within the stove.

A still further object is to provide a novel mechanism for moving the burners or heating elements to and from their extended position.

A still further object is to provide a novel design and arrangement of the parts of the stove, whereby simplicity and economy in construction are obtained.

The invention is illustrated in the accompanying drawings in which:

Figure 5 is a vertical section taken along line 5—5 of Figure 1, the burners or heating elements being shown in their extended position.

Figure 6 is a fragmentary sectional view and is taken along line 6—6 of Figure 1, the burners or heating elements being shown midway between their extended and retracted positions.

Figure 7 is a vertical section taken along line 7—7 of Figure 5, the burners or heating elements being shown in their retracted position.

Figure 4:
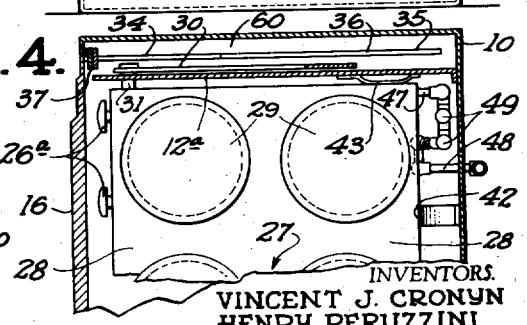
Figure 4 is a fragmentary horizontal section and is taken along line 4—4 of Figure 2.

The stove, as illustrated, includes a cabinet-like body 10 which is divided into a vertical series of compartments 11, 12, 13 and 14, the compartments 11 and 12 including doors 15 and 16, respectively, and the compartments 12 and 13 being separated by a horizontal wall 13a. The said doors are provided with handles 17 and at their lower sides are pivotally mounted in the stove body so that when open they occupy a substantially horizontal position. The compartment 11 is adapted to provide an oven while the upper part of the compartment 12 provides a broiler 18, a burner 19 being associated with the oven and broiler in a conventional manner and being connected to a suitable gas supply pipe 20. The compartment 12 preferably includes side walls 12a (Figures 4 and 7) which are suitably spaced from the side walls of the cabinet body, the broiler section 18 of the said compartment having a drawer 21 which is slidably supported between the side walls 12a upon angle members 22 and being provided with a suitable handle 21a. The drawer 21 may be pulled out to enable access to the broiler tray (not shown) after the door 16 is opened. The side walls of the broiler section 18 may, as illustrated, be provided with opposed series of ledges 23 for adjustably supporting the broiler tray in the desired relation with respect to the burner 19. The compartments 13 and 14 are auxiliary with respect to the compartments 11 and 12 and may be dispensed with if desired. They are available for the storage of kitchen utensils and such other articles as may be desired. In order to render the contents of the compartments 13 and 14 more accessible they include drawers 24 and 25, the former having low side walls so as to enable access to it at times when the door 16 may be open.

The service burners 26 of the stove are incorporated in a carriage 27 which is movably supported upon the wall 13a by rollers 27a. The carriage, as illustrated, including a top 28 formed in a conventional manner with openings over the burners and having suitable plates 29 for closing said openings. The carriage is normally located in the compartment 12 beneath the broiler. When in this position the door 16 of the said compartment may be closed and the service burners will be concealed from view.

In accordance with the invention the carriage 27 is movable to an extended position in which it lies wholly outside the compartment 12, the door 16 serving to support the carriage in its extended position as best shown in Figure 5. In this connection it will be noted that when the carriage is in its extended position the top 28 of the carriage is available for use similarly to the top of a cooking stove of conventional construction. When the carriage is in the compartment 12 the space occupied by the carriage when extended is available for other purposes. It will be apparent, therefore, that the stove has the advantage that additional space is provided in the vicinity of the stove when the service burners are not in use. Hence the stove is particularly desirable for use as an apartment stove or in other environments in which the space available is limited.

Means is provided whereby the carriage 27 is moved automatically to and from its extended position as the door 16 is opened and closed. In other words, assuming that the carriage 27 is in its retracted position and the door 16 is closed, the carriage may be moved to its full extended position by opening the said door and when extended may be moved to its retracted position within the compartment 12 by closing the door. To this end bars 30 are pivotally connected at one end to pins 31 which are carried at opposite sides and at the forward end of the carriage 27. At their opposite ends the said bars are connected to the lower ends of companion bars 32 to provide cooperating pairs of toggle joints which are located at the opposite sides of the carriage, the upper ends of the arms 32 being pivotally connected to the adjacent side walls of the cabinet body by pins 33.

Figure 1:
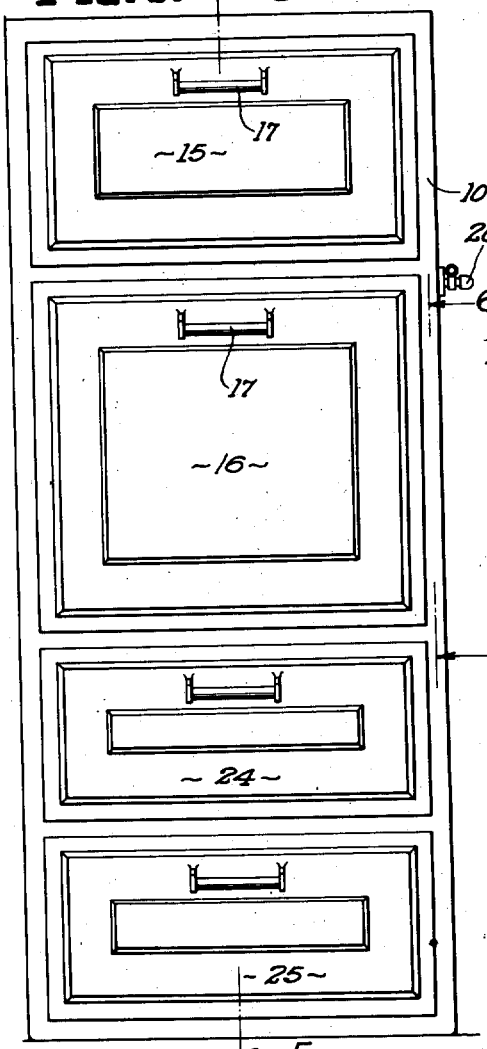
Figure 1 is a front elevation of a stove embodying features of the invention.
Figure 2:
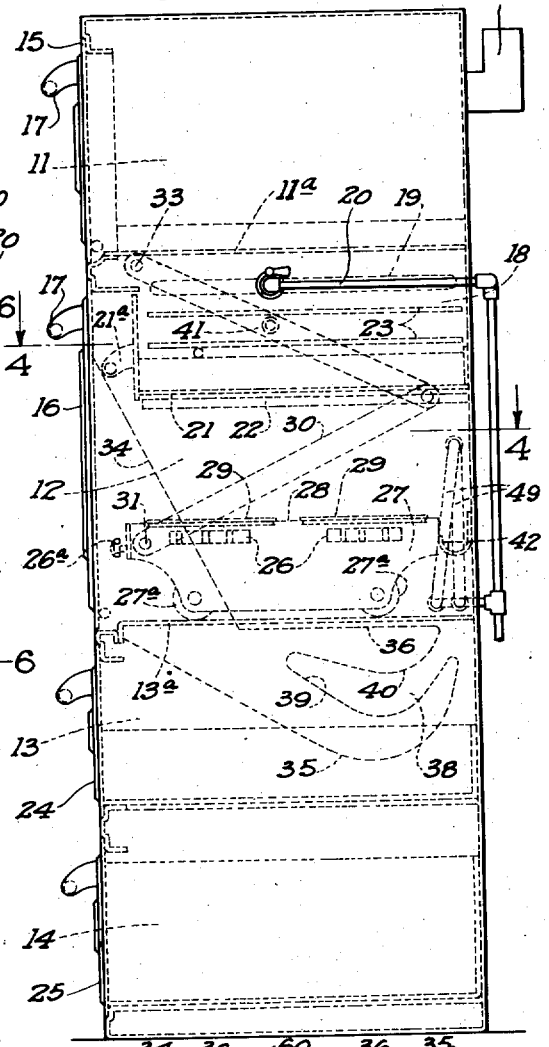
Figure 2 is a side elevation of the stove.
Figure 3:
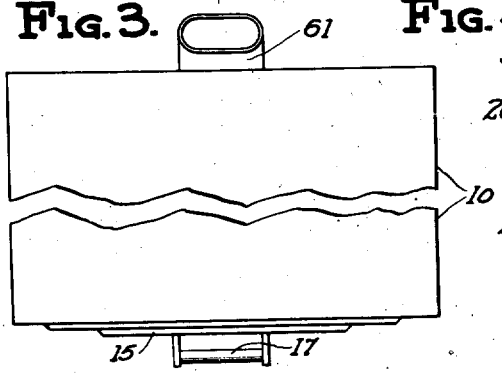
Figure 3 is a top view of the stove.

In order to operate the toggle bars to move the carriage 27 into and out of the compartment 12 in the manner described, arms 34 are carried by the opposite sides of the door 16. The said arms extend rearwardly adjacent the side walls of the cabinet and when the door 16 is closed (see Figure 2) parts of the arms lie along opposite sides of the compartment 12 between the side walls 12a of the said compartment and the side walls of the cabinet body while the lower parts or free ends 35 of the said arms lie along opposite sides of the compartment 13 between the sides of the drawer 24 and the side walls of the cabinet body. When in this position the forward or upper edges 36 of the free ends of the arms 34 lie in a substantially horizontal plane in the vicinity of the wall 13a. It will be apparent that as the door 16 is opened fully, that is to say to a position in which it is substantially horizontal, the free ends 35 of the arms 34 move to an upright position (see Figure 5) in which the forward edges 36 of the said ends are substantially vertical. As the forward edges 36 of the free ends of the arms 34 reach a vertical position they engage suitable stops 37 formed or provided upon in the cabinet body. The stops 37 arrest further outward movement of the free ends of the arms 34 and serve to support the door 16 in its open or horizontal position.

The movement of the arms 34 is utilized to operate the toggle links. To this end the free ends of the arms are formed with curved slots 38, each of the said slots providing cam surfaces 39 and 40. The entrances to the slots 38 are so formed that as the free ends of the arms 34 move upwardly and outwardly, during the final part of the opening movement of the door 16, rollers 41 which are mounted upon the toggle bars 32 enter the slots (see the dotted line position of the arms 34 in Figure 5). During the final part of the opening movement of the door, that is to say the movement from the dotted line position shown in Figure 5 to the full line position, the rollers 41 move from the entrances of the slots 38 to positions in the vicinity of the closed ends thereof. The movement of the rollers 41 from the entrances to the closed ends of the slots 38 is effected by the action of the cam surfaces 39, these surfaces engaging the rollers during the final part of the opening movement of the door. The bodily movement of the rollers 41 is transmitted through the toggle bars 30 and 32 to the carriage 27, the said bars and the cam surfaces 39 being so designed that as the forward edges 36 of the free ends of the arms 34 engage the stops 37 the carriage 27 reaches its fully extended position.

As noted heretofore, the cam surfaces 39 of the arms 34 came into play only during the final part of the opening movement of the door. In other words, the carriage 27 remains stationary in the compartment 12 during the first part of the opening movement of the door. During the final part of the opening movement of the door the carriage rolls out of the compartment 12 upon the back of the door. It will be apparent, therefore, that as the carriage 27 starts to roll out of the compartment 12 and upon the door 16 the latter is inclined to some extent. The toggle operating mechanism, however, is so designed that the carriage 27 is caused to roll up the inclined surface of the door, the angle of inclination of the latter decreasing as the carriage continues to move outwardly. Preferably the carriage reaches the limit of its outward movement as the door 16 reaches a horizontal position.

The carriage 27 may be returned to the compartment 12 by closing the door 16. During the initial part of the closing movement of the said door the cam surfaces 40 on the arms 34 engage the rollers 41 (see Figure 6) and force them rearwardly and upwardly. As the door closes the outer end of the carriage 27 is lifted as shown, thereby aiding movement of the carriage into the compartment. The rollers 41 follow the cam surfaces 40 until they reach the dotted line position shown in Figure 5. This movement of the rollers is transmitted through the toggle bars 30 and 32 to the carriage 27, the said carriage reaching the rearward limit of its range of movement within the compartment 12 as the rollers reach the said dotted line position. Thereafter, during the final part of the closing movement of the door the cam surfaces 40 move away from the rollers 41 and the free ends of the arms 34 move toward the dotted line position shown in Figure 2. As the carriage reaches the limit of its movement into the compartment 12 it comes to rest against a stop 42. The said stop cooperates with guide elements 43 formed or provided upon the side walls 12a of the compartment to hold the carriage in such a position that the rollers 41 will enter the slots 38 when the door 16 is opened. The side walls 12a are cut away as at 44 (Figure 6) to accommodate the pins 31 by which the toggle bars 30 are connected to the carriage, the said bars, as illustrated, being located between the side walls 12a of the compartment 12 and the side walls of the cabinet body. The slots 44 permit the carriage to move into the compartment 12 so that it abuts the stop 42 as described.

The service burners 26 are connected to a header 45 (at the forward end of the carriage 27) to which gas may be supplied through a conduit 46, the supply of gas to the burners being controlled by suitable valves 26a. The said conduit communicates with a pipe section 47 which depends from and which is rigidly secured to the rear end of the carriage, the said pipe section communicating with a branch 48 of the gas supply pipe 20 through a pair of pipe sections 49. The pipe sections 49 are suitably connected together and to the pipe sections 47 and 48 so that as the carriage is moved to its extended position they open or expand to the position shown in Figure 5. When the carriage is moved to its position within the compartment 12 the joined ends of the pipe sections 49 move upwardly as the said sections collapse upon one another (see dotted line position in Figure 5). It will be apparent, therefore, that by connecting the service burners to the main gas pipe in the manner described, gas will be available in both the extended and retracted positions of the carriage. It is to be noted that in the full line position of the pipe sections 49 (Figure 5) the said sections extend upwardly toward their connecting ends. This insures collapsing of the sections in the manner described when the carriage is moved into the compartment 12. In this connection it is to be understood that the plates 29 may, if this character of heating element is desired, be heated by electric resistance elements instead of by gas.

As illustrated, and preferred, the compartment 12 is so designed that there will be adequate space between the top 28 of the carriage and the bottom of the broiler to accommodate the cooking utensils that are normally employed in connection with the stove. This has the advantage that the contents of the utensils may be prevented from cooling rapidly, after having been cooked to the desired extent, by moving the carriage within the compartment 12 and closing the door 16.

When using the broiler the door 16 may be opened, without withdrawing the carriage 27, to the extent necessary to enable access to the broiler drawer 21. The latter can then be pulled out through the opening of the door 16 to the extent necessary to gain access to the broiler tray. The front panel 50 of the broiler drawer 21 is preferably formed with suitable openings 51 to permit the escape of the cooking vapors, it being understood in this connection that the door 16 may, as is customary with stoves of conventional construction, be left partially open during use of the broiler.

It will be noted (Figure 7) that the side edges of the bottom wall 11*a* of the top compartment 11 and the side walls 12*a* of the compartment 12 are spaced from the side walls of the cabinet-like body 10, thereby providing at each side of the said body a vertical passage 60 which communicates with the compartment 11. The top edges of side walls 12*a* of the compartment 12 terminate below the bottom wall 11*a* of the compartment 11 while the foremost edges of the said side walls (see Figure 4) terminate short of the door 16 of the compartment 12. Communication between the broiler section of the compartment 12 and the section which accommodates the carriage 27 and the passages 60 is thus insured at all times, it being apparent that the said sections of the compartment 12 are also in communication with one another through the openings 51 in the front panel of the broiler drawer 27. Any gases or vapors, therefore, which are produced during the use of the stove pass to the compartment 11, escape through an outlet 61. The passages 60 also communicate with the compartments provided for the drawers 24 and 25. Hence when the said compartments are employed for the storage of food any odors which result will be caused to leave the stove through the outlet 61 and will, therefore, be disposed of in the same manner as the gases or vapors from the various cooking compartments. It will be seen that the lower compartment or cooking chamber has communication with the upper compartment and is disposed in heating relation therewith and that when the slidable cooking unit is operated within the lower compartment to perform a cooking operation, it also heats the upper compartment. The slidable cooking unit may also be operated in the advanced position outside of the lower cooking compartment to perform a cooking operation without heating the upper compartment.

Having fully described our invention, we claim:

1. Mechanism for moving a heating unit into and out of a compartment of a stove having a door which is movable to one position in which it closes said compartment and which is movable to an open position in which it is supported in a substantially horizontal plane, said mechanism including a carriage for said unit, a pair of connected links at each side of said carriage, one of each of said pairs of links being connected at the front of said compartment to a stationary part of said stove and the other of each of said pairs of links being connected to the front end of the adjacent side of said carriage, a lateral projection carried by one of the links of each of said pairs of links, arms carried by said door, said arms engaging said projections as said door approaches its open position to move said carriage out of said compartment upon the back of said door and a conduit for connecting said unit to a source of fuel when said carriage is moved to such position, said conduit being collapsible to permit said carriage to be moved back into said compartment when said door is moved to its closed position.

2. Mechanism for moving a heating unit into and out of a compartment of a stove having a door which is movable to one position in which it closes said compartment and which is movable to an open position in which it is supported in a substantially horizontal plane, said mechanism including a carriage for said unit, a pair of connected links at each side of said carriage, one of each of said pairs of links being connected at the front of said compartment to a stationary part of said stove and the other of each of said pairs of links being connected to the front end of the adjacent side of said carriage, a lateral projection carried by one of the links of each of said pairs of links, arms carried by said door, said arms being formed with curved slots which provide opposed cam faces, said projections entering said slots as said door approaches an open position, whereby certain of the cam faces of said arms engage said projections to move said carriage out of said compartment upon the back of said door and a conduit for connecting said unit to a source of fuel when said carriage is moved to such position, the other cam faces of said arms engaging said projections when said door is moved to a closed position to move said carriage back into said compartment, said conduit being collapsible to permit said carriage to be moved into said compartment in the manner described.

3. Mechanism for moving a heating unit into and out of a compartment of a stove having a door which is movable to one position in which it closes said compartment and which is movable to a second position in which arms carried by said door are engageable with stops to support said door in a substantially horizontal plane, said mechanism including a carriage for said unit, a pair of connected links at each side of said carriage, one of each of said pairs of links being connected at the front of said compartment to a stationary part of said stove and the other of each of said pairs of links being connected to the front end of the adjacent side of said carriage, said arms engaging one of each of said pairs of links as said door approaches its open position to move said carriage out of said compartment upon the back of said door and a conduit for connecting said unit to a source of fuel when said carriage is moved to such position, said conduit being collapsible to permit said carriage to be moved back into said compartment when said door is moved to its closed position.

4. Mechanism for moving a heating unit into and out of a compartment of a stove having a door which is movable to one position in which it closes said compartment and which is movable to a second position in which a pair of arms carried by said door are engageable with stops to support said door in a substantially horizontal plane, said mechanism including a carriage for said unit, a pair of connected links at each side of said carriage, one of each of said pairs of links being connected at the front of said compartment to a stationary part of said stove and the other of each of said pairs of links being connected to the front end of the adjacent side of said carriage, a lateral projection carried by one of the links to each of said pairs of links, said arms engaging said projections as said door approaches its open position to move said carriage out of said compartment upon the back of said door and a conduit for connecting said unit to a source of fuel when said carriage is moved to such position, said conduit being collapsible to permit said carriage to be moved back into said compartment when said door is moved to its closed position.

5. In a range of the character described, the combination of an upper cooking compartment, a burner for heating said upper cooking compartment, a lower compartment or cooking chamber having communication with said upper cooking compartment and disposed in heating relation therewith, a cooking unit slidably mounted in said lower compartment and including one or more burners which are operable therewithin to perform a cooking operation and at the same time to heat said upper compartment, said cooking unit being movable to an advanced position outside of said lower compartment and being there operable to perform a cooking operation without heating said upper compartment, and means for supplying a heating medium to said cooking unit in either position thereof.

6. In a range of the character described, the combination of an upper cooking compartment, a burner for heating said upper cooking compartment, a lower compartment or cooking chamber having communication with said upper cooking compartment and disposed in heating relation therewith, a cooking unit slidably mounted in said lower compartment and including one or more burners which are operable therewithin to perform a cooking operation and at the same time to heat said upper compartment, said cooking unit being movable to an advanced position outside of said lower compartment and being there operable to perform a cooking operation without heating said upper compartment, means for supplying a heating medium to said cooking unit in either position thereof, and means associated with said upper and lower compartments for conveying the products of combustion from said lower compartment to a point beyond the burner which heats said upper compartment whereby both said burner and said cooking unit may be operated simultaneously with the slidable cooking unit in the retracted position.

VINCENT J. CRONYN.
HENRY PERUZZINI.